United States Patent [19]

Munier et al.

[11] Patent Number: 5,128,666

[45] Date of Patent: Jul. 7, 1992

[54] PROTOCOL AND APPARATUS FOR A CONTROL LINK BETWEEN A CONTROL UNIT AND SEVERAL DEVICES

[75] Inventors: Jean-Marie Munier, Cagnes sur Mer; Michel Poret, Villeneuve Loubet; Jean-Claude Robbe, Cagnes sur Mer, all of France

[73] Assignee: National Business Machines Corporation, Armonk, N.Y.

[21] Appl. No.: 573,108

[22] Filed: Feb. 20, 1990

Related U.S. Application Data

[63] Continuation of Ser. No. 171,067, Mar. 21, 1988, abandoned.

[30] Foreign Application Priority Data

Apr. 28, 1987 [EP] European Pat. Off. ........ 87430016.3

[51] Int. Cl.⁵ .............................................. G05B 23/00
[52] U.S. Cl. ........................... 340/825.06; 340/825.08; 340/505
[58] Field of Search ................. 340/825.05, 825.06, 340/825.07, 825.08, 502, 505, 825.54, 313, 314; 370/24, 32; 375/7, 8; 455/54

[56] References Cited

U.S. PATENT DOCUMENTS

| 3,747,067 | 7/1973 | Fox et al. ................................. 375/8 |
| 3,764,977 | 10/1973 | Weeden, Jr. ............................. 375/8 |
| 3,986,119 | 10/1976 | Hammer, Jr. et al. ............... 455/89 |
| 4,225,919 | 9/1980 | Kyu et al. ................................ 364/85 |
| 4,247,908 | 1/1981 | Louchart, Jr. et al. .............. 455/31 |
| 4,254,401 | 3/1981 | Murano et al. ................... 340/825.5 |
| 4,255,741 | 3/1981 | Peterson ........................ 340/825.03 |
| 4,346,440 | 8/1982 | Kyu et al. ............................. 364/200 |
| 4,354,252 | 10/1982 | Lamb et al. .......................... 340/502 |
| 4,358,825 | 11/1982 | Kyu et al. ............................. 364/200 |
| 4,368,512 | 1/1983 | Kyu et al. ............................. 364/200 |
| 4,646,082 | 2/1987 | Engel et al. .......................... 340/502 |
| 4,652,859 | 3/1987 | Van Wiener ........................... 379/40 |

FOREIGN PATENT DOCUMENTS 2167921 6/1986 United Kingdom .................... 375/8

OTHER PUBLICATIONS

Berglund, "Modern Wrap Back Test", Aug. 1966, vol. 9, No. 3, p. 278.
IBM Technical Disclosure Bulletin, vol. 26, No. 6, 11/83, pp. 3011-3017, New York, US; C. Williams; "Narrow Interface for Peripheral Adapters".
Patent Abstracts of Japan, vol. 8, No. 115 (E-245)[1552], May 29, 1984; & JP-A-59 28 745 (Hitachi Seisakusho K.K.) Feb. 15, 1984.

Primary Examiner—Donald J. Yusko
Assistant Examiner—Peter Weissman
Attorney, Agent, or Firm—Joscelyn G. Cockburn

[57] ABSTRACT

An interface and protocol for linking devices (18) with a control unit (10). The interface includes a dedicated request line (30) per device, a dot-ORed acknowledge line (32), at least one clock line (38) transmitting sets of N clock pulses from the control unit to a device during each data exchange, two data line (34, 36) for serial duplex data transmission and a pair of shift registers one being positioned in the control unit and another being positioned in each of the devices. The protocol is such that for either a read or a write operation the control unit issues two request signals in spaced relationship on the request line and the selected device responds with two acknowledge signals is spaced relationship on the acknowledge line with each one of the acknowledge signals falling after the fall of its associated request signal.

4 Claims, 9 Drawing Sheets

FIG. 12

| DCA state | DCA operation | Device operation | Dev state |
|---|---|---|---|
| 0 | DCA idle | Device idle | 0 |
| 1 | (a)<br>-Load DCA Shift Register (Data, Cmd) from CP (12)<br>-Set DCA busy status (b)<br>-Test ACK off | | |
| 2 | Receive ACK off<br>-Set RQ on for ph1<br>-Wait for ACK on (c) | | |
| | | Receive RQ on<br>-Load Device Shift Reg. with ph1 Status<br>-Set ACK on | 1 |
| 3 | Receive ACK on<br>-Execute shifting between DCA and Device | | |
| 4 | End of Shift<br>-Set RQ off<br>-Check ph1 Status contents<br>-Wait for ACK off (d) | | |
| | | Receive RQ off<br>-Set ACK off<br>-Wait for RQ on (e) | 2 |
| 5 | Receive ACK off<br>-Set RQ on for ph2<br>-Wait for ACK on (c) | | |
| | | Receive RQ on<br>-Check ph1 contents valid (pty, Dev Addr, Cmd valid)<br>-Execute Cmd<br>-Load Device Shift Reg. (Data, Status)<br>-Set ACK on | 3 |
| 6 | Receive ACK on<br>-Execute shifting between DCA and Device | | |
| 7 | End of Shift<br>-Set RQ off<br>-Check ph2 contents<br>-Wait for ACK off (d) | | |
| | | Receive RQ off<br>-Set ACK off<br>-Device idle | 0 |
| 0 | Receive ACK off<br>-Reset DCA busy status (b)<br>-DCA idle | | |

PROTOCOL AND APPARATUS FOR A CONTROL LINK BETWEEN A CONTROL UNIT AND SEVERAL DEVICES

This application is a continuation of Ser. No. 07/171,067 filed Mar. 21, 1988, now abandoned.

FIELD OF THE INVENTION

The invention relates to a communications link comprising an apparatus and a protocol especially adapted for safe transmission of signals between a Control Unit and devices connected to said Control Unit.

It provides an intermediate between fast but short links using a simple protocol (parallel busses), and long distance serial links using a sophisticated protocol.

BACKGROUND ART

Communication means roughly fall into two distinct categories:

the busses, allowing data transfers in parallel form. They include data lines (e.g. 16 lines for transfers by halfwords) and control lines to sustain the protocol. Busses are well suited for applications needing fast data transfers over limited distances.

However, the number of wires is high (e.g. 30 lines), and the port attaching each communicating part is costly. On the other hand, the protocol used on busses is generally simple.

the serial links, allowing data transfers in serial form. Only 1 or 2 links (i.e. 2 or 4 wires) are needed to communicate at more moderate data rates over large distances. However, as every control and data information is transmitted on the same link, a sophisticated protocol is needed (such as HDLC protocol), and thus the port attaching each communicating part is also costly.

None of the above solutions is technically nor economically appropriate in case of a control link between a control unit and devices.

In fact, in such a case, several requirements have to be met: a small amount of information has to be exchanged between the control unit and the devices on a very reliable basis, at moderate transmission rates and over moderate distances.

It is then an object of the invention to provide a simple control link structure having only a limited amount of complexity contained in each device port, and wherein the link includes only a limited number of wires.

It is a further object of the invention to provide a control link structure and a protocol enabling each device to be connected either in a point-to-point or a multi-point configuration, and wherein it is further possible to efficiently test the whole link from the control unit, thus enhancing reliability.

SUMMARY OF THE INVENTION

In accordance with the invention, the above requirements lead, as will be farther described, to a control link ensuring synchronous data transfers in serial form, the clocking signals being provided to each device.

According to the invention, the control unit is connected to each device by a dedicated multi-point control link, but, seen from a device, the Device Control Link (DCL) has a constant structure, and comprises:
two control lines per device (Request, Acknowledge)
two data lines for a serial duplex data transmission
a clock line.

It is to be noted that a point-to-point configuration (FIG. 2) is only a particular configuration of the control link, where the number of devices per link is restricted to one. In any case, the device port is the same regardless of the number of devices.

In a multipoint configuration, the Control Unit and several devices have their data lines connected into a loop, and both the Control Unit and each device comprise N-bit shift register means connectable to said data lines in order to obtain a transmission loop. Upon request of the Control Unit, a given device connects its own N-bit shift register into said loop.

Thus, the transmission principle consists in exchanging the contents of the N-bit shift registers of the Control Unit and of the device having to communicate with it.

Accordingly, on N clocking pulses provided by the Control Unit, the N bit contained in both aforementioned shift registers are being exchanged.

The protocol used with the link comprises two phases (1 and 2), N bit of information being exchanged during each phase.

The two phases are separated by a predetermined time interval, during which the control unit verifies that the first phase has been completed.

BRIEF DESCRIPTION OF THE DRAWINGS

FIG. 12 represents the successive operation phases within the Control Unit and each device.

DETAILED DESCRIPTION OF THE INVENTION

Figure 1:
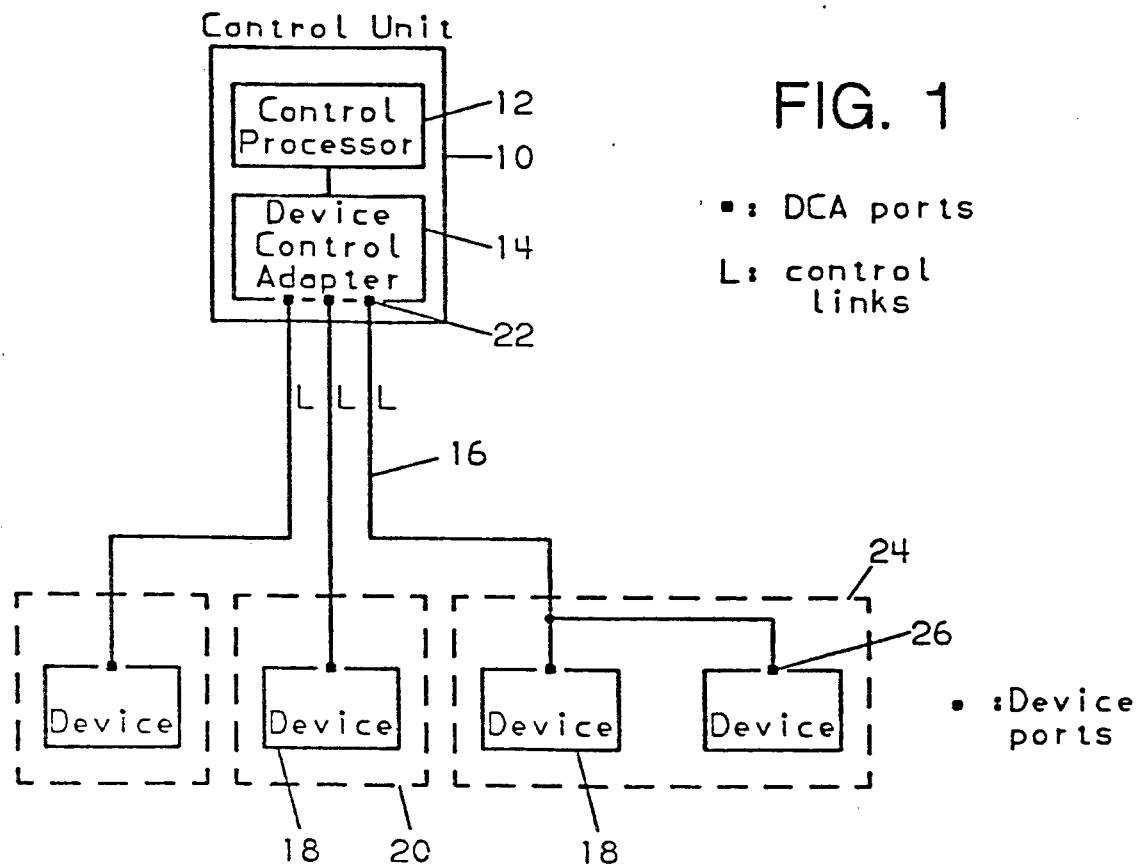
FIG. 1 a Control Unit connected to several devices by control links as defined by the invention.

FIG. 1 shows a Control Unit (10) and several devices (18) to be controlled by the Control Unit, by means of a Device Control Adapter (DCA) (14) connected to said devices by several control links (16) described in the invention.

The Device Control Adapter (14) is the communicating part of the Control Unit (10), and is driven by a control processor (12). Therefore, it is linked to the control processor (12) in a conventional way, for example through a parallel bus.

The devices (18) are generally implemented on cards (20), but several devices may also be implemented on a common physical entity (e.g. a card (24) or more generally a Field Replaceable Unit), a single control link (16) being used for those devices connected in a multi-point configuration. Such common physical entities are represented by dashed lines in FIG. 1.

It is to be noted that for more simplicity, the Control Unit (10) will be assumed to be connected to the devices (18) by one unique control link (16) in all the following developments, where only one DCA part (22), only one device port (26) and only one control link (16) will be described.

Figure 2:
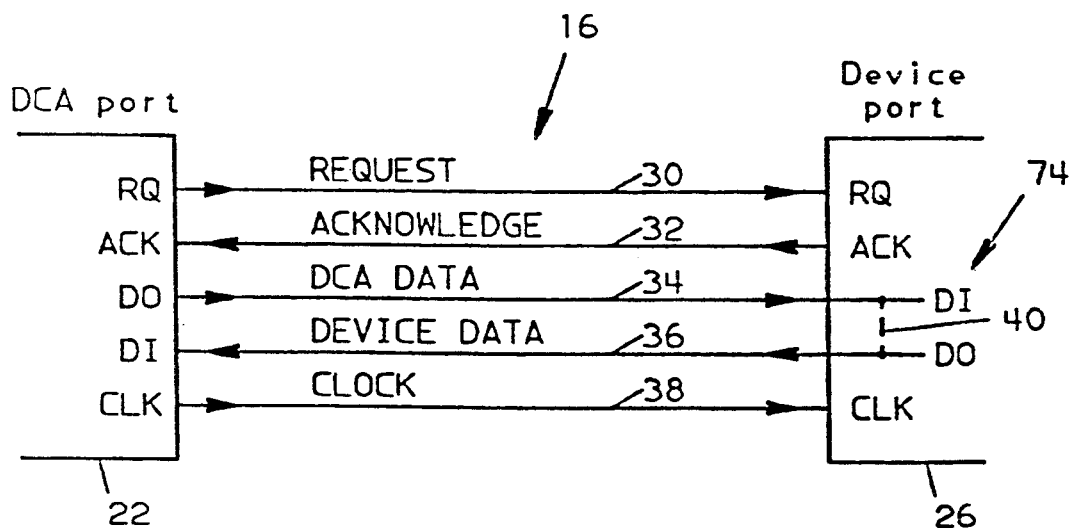
FIG. 2 represents the basic structure o the control link according to the invention, in a point to point configuration.

In FIG. 2, the structure of a control link (16) according to the invention, is shown. It is represented in the simplest case: a point-to-point configuration, where the DCA port (22) is connected by a single link (16) to a unique device (not shown), through a device port (26). The control link (16) includes basically three outgoing lines (30,34,38) transmitting respectively a "Request" signal, a "DCA DATA" signal and a "CLOCK" signal, and two ingoing lines (32,36) transmitting respectively an "Acknowledge" signal and a "DEVICE DATA" signal.

As long as the Request line (30) is not activated by the DCA, the outgoing DCA DATA line (34) is wrapped onto the ingoing DEVICE DATA line (36) (as represented by dashed line 40), so as to form a loop (74).

As will be explained farther, the internal Shift Register means of the device are connected into said loop upon receipt by said device, of an active Request signal.

As will also be described farther, each device has very little complexity, and is designed for exchanging data with the Control Unit only upon request of the latter.

Upon receipt of a Request signal transmitted by the DCA of the Control Unit, the device sends back, through its device port (26), an "Acknowledge" signal, like in any handshaking protocol.

Once the exchange of data is granted by the DCA (14), it transmits clock pulses to the device port on line (38), and synchronously transmits or receives the successive bits of a data word, on respective lines (34) or (36).

Figure 3:
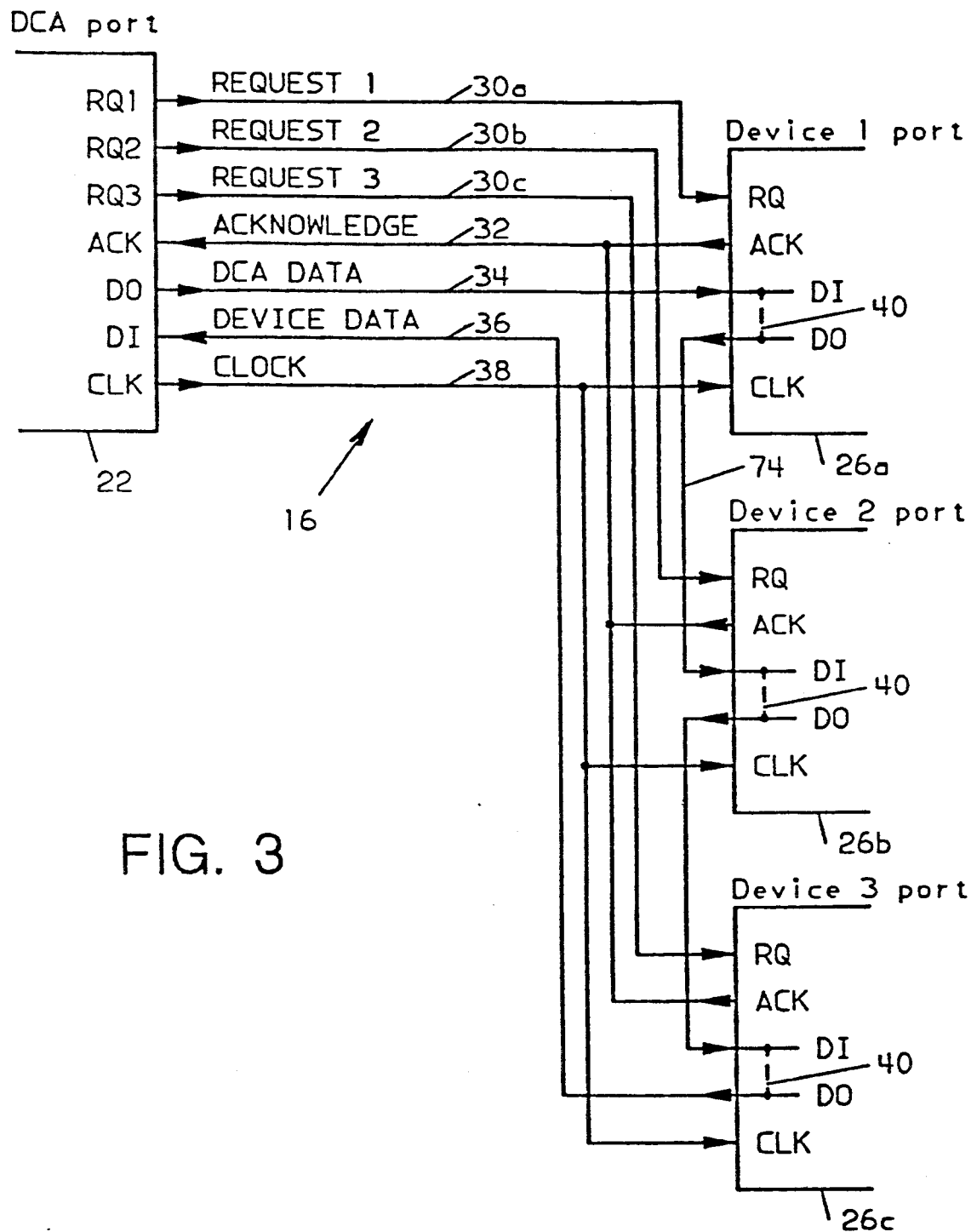
FIG. 3 represents the structure of the control link in a multi-point configuration.

However, in most cases, the DCA port (22) of a Control Unit is connected by a single control link (16) to a plurality of devices, as shown in FIG. 3. In such a case, the control link (16) according to the invention is a multi-point link. This means that each device is connected by its device port (26a,26b,26c...) to the DCA port (22) by means of a dedicated Request line (30a,30b,30c..., and the different request signals accordingly form a parallel bus.

In the contrary, the data lines (34,36) are connected so as to form a serial transmission link. More accurately, with respect to their data lines DCA DATA and DEVICE DATA, the DCA port (22) and the device ports (26a,b,c...) are connected into a loop (74) including lines (34,40,36) and the shift register means (not shown) of both the DCA (14) and the devices (18).

In this loop, the Data Out (DO) port of the DCA is connected to the Data In (DI) port of the first device port (26a), while the Data In (DI) port of the DCA is connected to the Data Out (DO) port of the last device port (26c) in the loop.

Furthermore, a device port (26b) which is connected in an intermediate position in the loop, has its Data In port connected to the Data Out port of the preceding device port (26a), and its Data Out port is connected to the Data In port of the succeeding device port (26c) in the loop.

The internal registers (not shown) of a given device port, which are located between the Data In and the Data Out ports of a device, are not always connected into the loop. Instead they are only individually connectable to said loop by adequate means described later. The connection of the internal data registers of a given device into the loop becomes effective only upon receipt of the Request signal dedicated to said device and transmitted to it by the Control Unit.

This is shown in FIG. 3 by dashed lines (40), and its implementation will be explained in relation to FIG. 5.

In the multipoint configuration of the link as shown in FIG. 3, the acknowledge lines of all the devices are preferably dotted and a unique Acknowledge signal is thus fed to the DCA port (22) by line (32).

Similarly, the outgoing clock signal (with reference to the DCA port) is applied in parallel to each device port (26a,b,c...).

Figure 4:
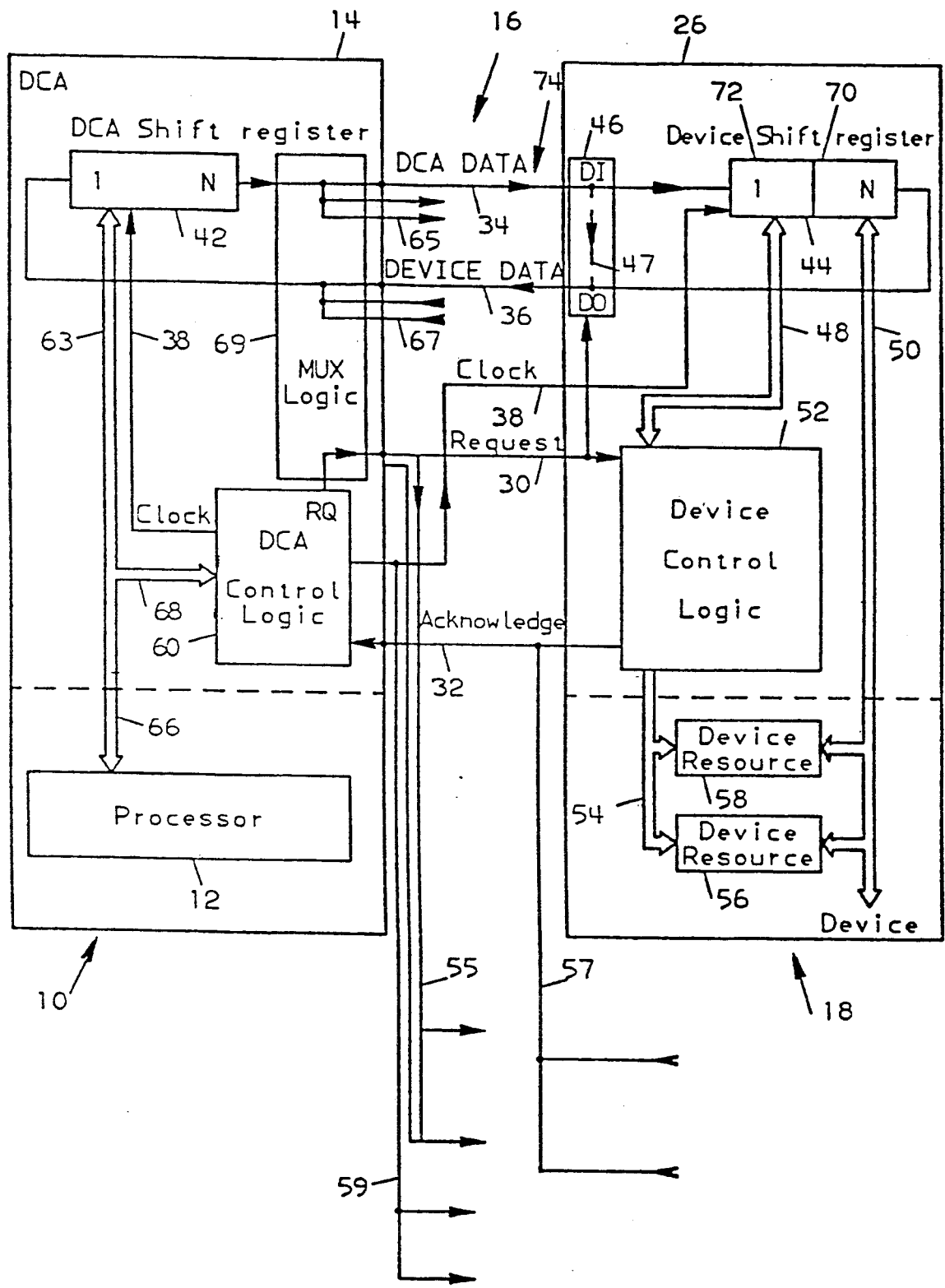
FIG. 4 represents the general structure of the Control Unit, a device and one Control Link as shown in FIG. 1.

In FIG. 4, the general structure of the control link (16), of the Control Unit (10) and of a device (18), is shown. As long as its Request line (30) is inactive, the device port (26) wraps its Data In line (DCA DATA) onto its Data Out line (DEVICE DATA). This allows a permanent link test by adequate testing means located in DCA, as will be explained farther. The wrapping of Data In line (DI) onto Data Out line (DO) is done by a gating logic (46) responsive to the Request signal provided on line (30) and detailed with reference to FIG. 5, the connection between both said lines being here simply represented by a dashed line (47).

Both DCA (14) and device (18) comprise an N-bit shift register respectively referenced (42) and (44).

The transmission principle consists in exchanging the contents of said two shift registers by means of N clock pulses provided by DCA (14) on clock line (38), when the connection represented by dashed line (47) is open.

The transmission starts when Request line (30) is activated by DCA. The device (18) has then to stop its internal processing with its own clocking system (not shown), to open the Data In-Data Out wrap (connection 47 opened), and to raise Acknowledge line (32) to indicate that it is ready to accept data and clock from DCA.

Indeed, since N-bit words have to be exchanged by the Control Unit and each device, said words have to be first internally transmitted to the respective N-bit shift registers (42) and (44) and loaded therein.

This is performed, on the Control Unit side, by a bus (63) which simply transmits the information between the N-bit shift register (42) and the processor (12) of the Control Unit.

Figure 6:
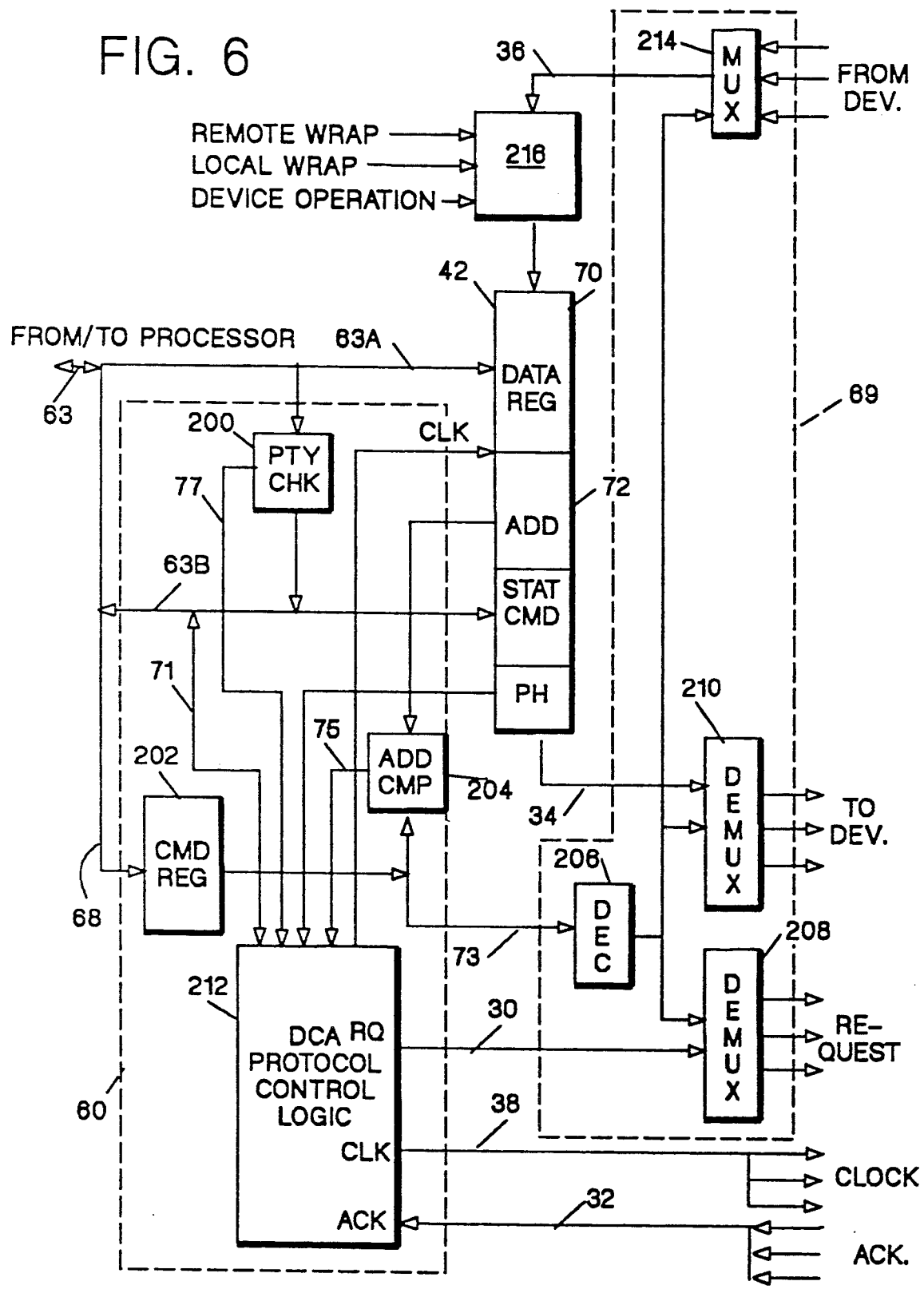
FIG. 6 represents in greater detail, the structure of the Device Control Adapter (DCA) of the Control Unit.

In FIG. 4, it is further shown that the data exchanged between processor (12) and DCA Shift Register (42) on bus (63) are also transmitted on bus (68) to a DCA Control Logic circuit (60), detailed in FIG. 6. This circuit internally generates the Clock signal transmitted to the shift registers (42, 44) on lines (38), and the Request signal.

Since the Request signal has to be successively transmitted to several devices, it is multiplexed by a multiplexing logic (69).

In FIG. 4, a bus (55), a line (59) and a line (57) are further shown, corresponding respectively to the Request signal which is multiplexed toward other devices (not shown) connected to the Control Unit by the same link (16), to the clock line driven toward the devices, and to the dotted acknowledge lines transmitted by said devices toward the Control Unit on line (32).

Moreover, if the DCA (14) is to be connected to additional devices (not shown), by supplemental links, the outgoing DCA DATA line (34) and the ingoing DEVICE DATA line (36) are multiplexed toward said devices by the multiplexing logic (69) and the wires (65, 67).

It is to be noted that the Device Shift Register (44) includes two main fields: a data field (70) and a command or status field (72), the function of which will be explained farther in relation with the description of the transmission protocol on the present control link.

On the device side, the same function as the one of bus (63) is done on the one hand by a data bus (50) connected in parallel to the internal resources (e.g. registers) (56,58) of the device and to the data field (70) of the Device Shift Register (44), and on the other hand by busses (48, 54) and a Device Control Logic (52).

Thus, the data to be read from the resource (56,58) of the device or written into same, are transmitted on a data bus (50).

A given resource (56,58) is selected and enabled by signals on bus (54) which are derived from command bits on bus (48) by the device control logic (52) further detailed with reference to FIG. 5.

Figure 5:
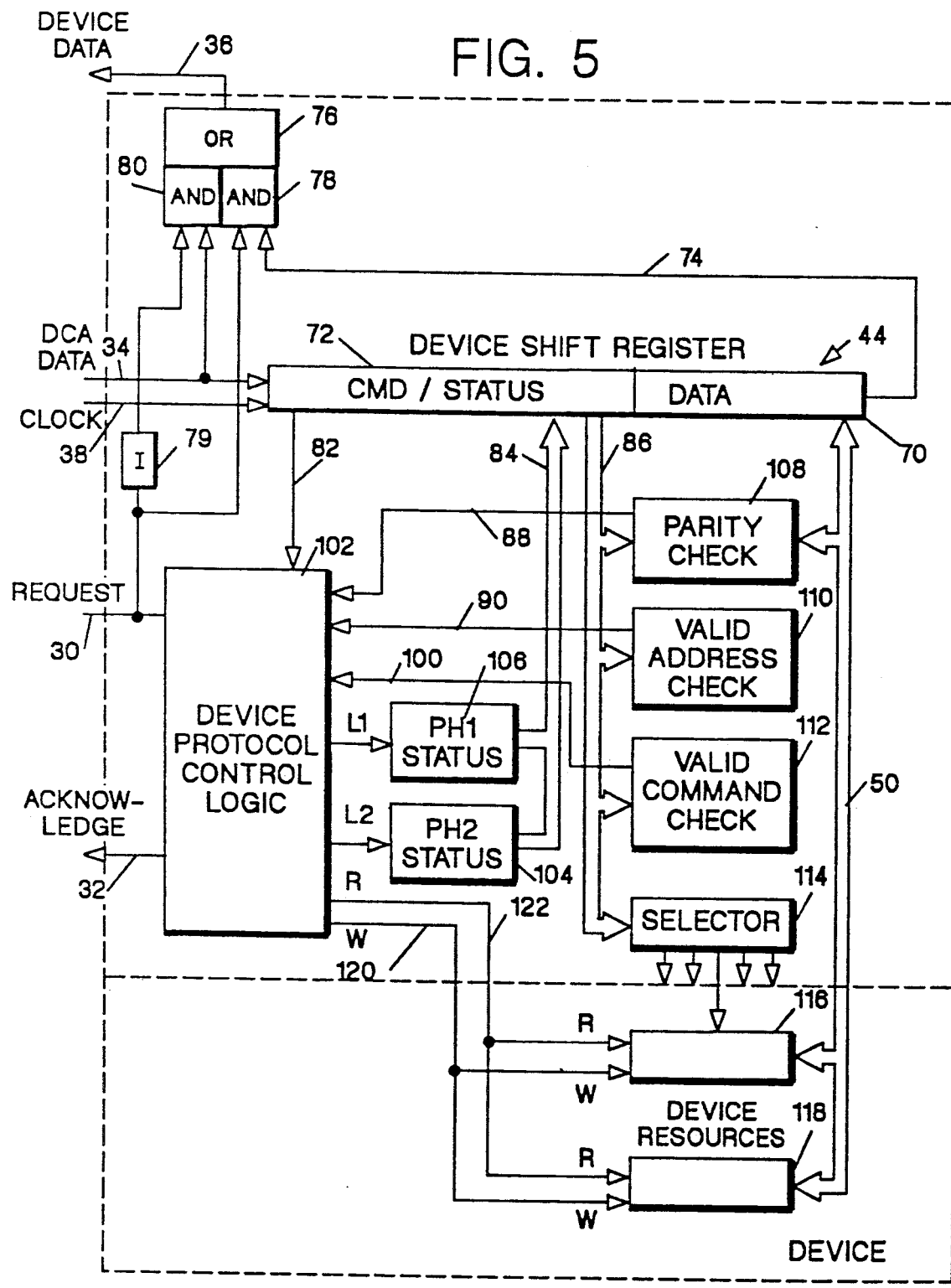
FIG. 5 represents in greater detail, the structure of a device.

In FIG. 5, the internal structure of each device port (26) is shown in greater detail.

Accordingly, the gating logic (46) represented in FIG. 4 and closing or opening the connection (47) is preferably composed, as shown in detail in said FIG. 5, of a two AND/OR circuit positioned into the loop realized by the DCA DATA line (34) and the DEVICE DATA line (36), for connecting the shift register (44) of the device into said loop (74) upon receipt of a Request signal by the device.

Therefore, the Request signal available on line (30) is applied to an AND gate (78) which also receives the output of the device shift register (44) provided on the loop (74).

Furthermore, the same request signal is inverted by inverter (79) and applied to another AND gate (80) which also receives the signal present on DCA DATA line (34). The outputs of both above mentioned AND gates are ORed by OR gate (76), the output of which is connected to the DEVICE DATA line (36).

As a consequence, as long as the Request signal is low, the output of Device Shift Register (44) remains disconnected from the DEVICE DATA line (36), the DCA DATA line (34) being directly wrapped onto the DEVICE DATA line (36). But, as soon as the Request signal received by the device becomes high (with positive logic), it gates the output of Device Shift Register (44) through AND gate (78) and OR gate (76), so that the content of said Device Shift Register (44) may be transmitted to the DCA, upon receipt by the device, of N clock pulses transmitted by said DCA on line (38).

As previously mentioned, the data field (70) has to communicate with the internal device resources (i.e. registers) (118), by means of a parallel internal bus (50).

Nevertheless, a given device resource (118) can communicate with the data field (70) of the device shift register (44) only if it has at first been selected by a selector circuit (114) and if it has been allowed by a protocol control logic circuit (102), to read the data from the data field (70), or to write data into same.

The selector circuit (114) decodes the address of the device resource (118), as provided by the command field (72) of the device shift register (44), and accordingly, it generates an appropriate "selection" signal on its output wires (116), for selecting the proper device resource (118) to be read from or written into.

Each device includes a "Parity checking circuit" (108), a "valid address checking circuit" (110) and a "valid command checking circuit" (112) connected to the command field (72) of the device shift register by a bus (86).

In fact, these checking circuits are very simple combinatorial circuits, the aim of which is to verify that the address of a resource and the command contained in the command field (72) are consistent with the cabled address of the corresponding resource, and that the parity of the command and/or data words is correct. Thus, said simple checking circuits (combination of a few AND/OR gates) will not be further detailed.

If one of the above mentioned conditions is untrue, the checking circuits (108,110,112) generate a control signal transmitted to the Device Protocol Control Logic circuit (102) on respective wires (88,90,100). The Device Protocol Control Logic circuit (102) further receives on wire (82), a bit of the command field (72) corresponding to the Read/Write indicator. This indicator is used for multiplexing, within the Device Protocol Control Logic (102), the Read or Write commands applied to the device resources(118) on lines (120,122).

According to the invention, an important advantage in terms of transmission reliability is provided by the use of two transmission phases (phase 1, phase 2) corresponding respectively to a phase 1 status word and a phase 2 status word transmitted by the device to the DCA. Those phases will be later detailed.

However, a phase 1 status word or a phase 2 status word has to be loaded from two respective registers (106,104) into the command or status field (72) of the device shift register (44), prior to each transmission phase on the control link. These status words are loaded into the device shift register (44) through a bus (84), upon a loading command L1 or L2 timely transmitted to the corresponding register (106,104) by the Protocol Control Logic circuit (102).

It is to be noted that the Device Protocol Control Logic circuit (102) is a very simple sequential circuit including a timer (not shown) and simple logic, which has just to generate, upon receipt of a Request signal, signals such as Acknowledge, L1 (load Phase 1 status), L2 (load Phase 2 status), Read (R), Write (W). Those signals are generated in a sequence described with reference to the FIGS. 9 to 12 related to the operation protocol of the present control link.

FIG. 6 shows a more detailed implementation of the DCA (14). For greater simplicity of the figure, the busses are represented by single lines.

The data are exchanged between the data field (70) of the DCA Shift Register and the processor through a bidirectional bus (63a), and between the command field (72) and the processor through busses (63b, 68, 71). When transmitted from the processor (not shown) to the command field (72), the data are latched by a command register (202) included in DCA Control Logic (60) (dashed block), so that the data can be read again from field (72) to the processor through bus (63b).

The DCA Control Logic (60) further comprises a Parity Checking circuit (200) which receives the data and command bits on busses (63a, 63b). The occurrence of a parity error is signalled through line (77) to a DCA Protocol Control Logic circuit (212) including a timer (not shown) and simple combinational logic.

Further, the device address bits transmitted on a part of bus (68) are forwarded through bus (73) to an address comparator circuit (204), where they are compared with the address field loaded by a device into the command field (72). If the addresses mismatch, the DCA is not in Communication with the right device, and this event is signalled (on line (75)) through DCA Protocol Control Logic (212) to the Control Unit processor, where an appropriate action is taken (transmission reinitiation; error recovery, not in the scope of the invention).

Furthermore, the device addresses on bus (73) is transmitted to an address decoder (206) within the multiplexing logic (69).

The decoded address activates the Request signal demultiplexer (208) which sends the Request signal to the devices and the DCA DATA line demultiplexer (210). The latter is fed through DCA data line (34), with the N bits words to be transmitted to a plurality of devices. Besides, the data coming from various devices connected on several links of the type described herein, are multiplexed toward the DCA Shift register (42) by a multiplexer (214). These incoming data cross a testing facility (216) (later described) which allows to test the link by local and remote wrapping, provided no device is exchanging data with the DCA.

Figure 7:
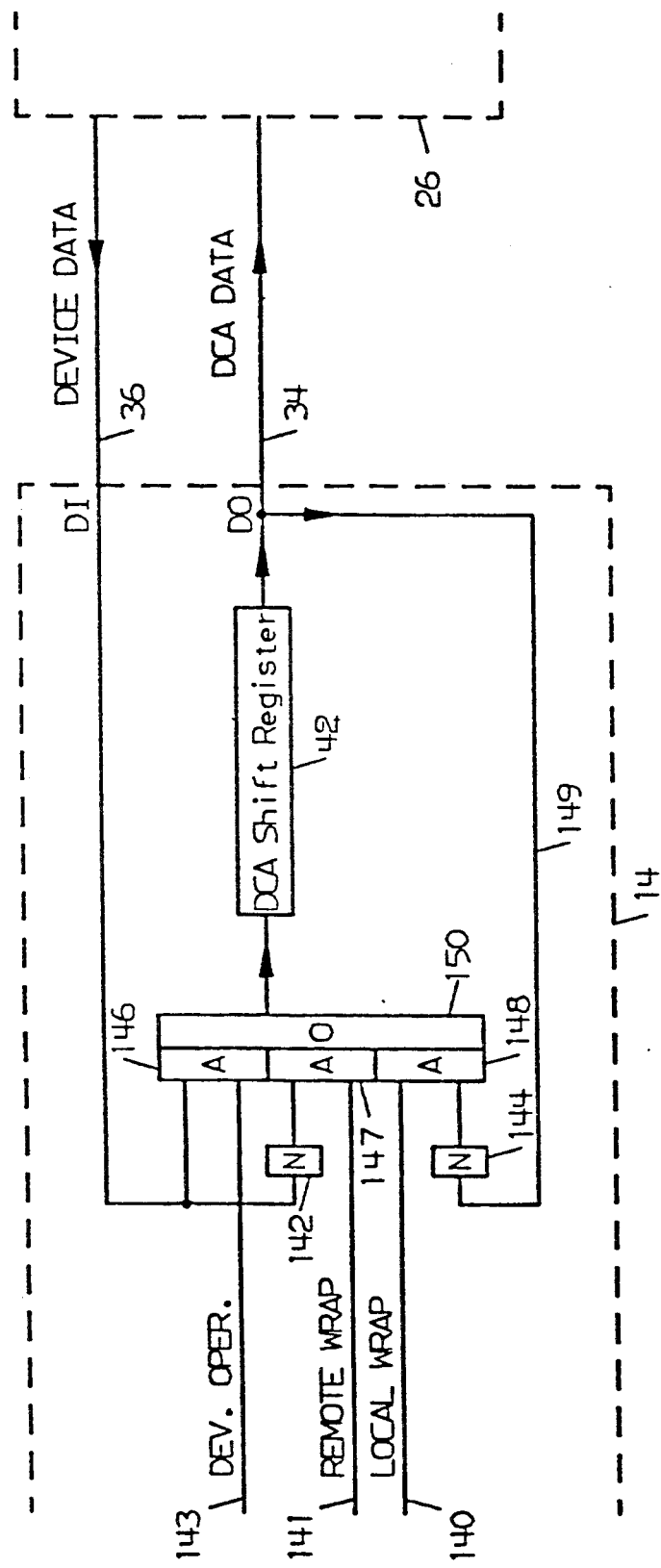
FIG. 7 represents an additional testing facility of the Control Link.

In its preferred embodiment, the present control link includes two further interesting facilities, as shown in FIGS. 4, 6 and 7. These facilities include link testing means allowing the whole control link to be tested from the DCA. More particularly, said link testing means include a "DCA remote wrap" facility, and a "DCA local wrap" facility. The first permits testing of the control link (16) when no device has its Request line raised by the DCA, (Device Operation (143) inactive) and the second permits a local test of the DCA port (14) itself, prior to a transmission phase on the control link. It has been previously explained that the DCA DATA line (34) connected to a given device is wrapped onto its DEVICE DATA line (36), as long as no Request line is activated.

This allows DCA port (14) to permanently check a given link, by shifting its Shift Register (42) contents without raising Request line, and thus be sure that this link is operational. The implementation of this "Remote Wrap" facility includes the loop realized by DCA shift register (42), DCA DATA and DEVICE DATA lines (34,36) and a two-AND/OR circuit (146,147,150) as shown in FIG. 7. If device operation line (143) is inactive, the bits transmitted on DEVICE DATA line (36) are inverted by inverter (142) and shifted into DCA Shift Register (42) upon receipt of a REMOTE WRAP command issued by the Control Unit. Consequently, after N clock pulses, the DCA Shift Register (42) must contain the original content inverted. If this is not the case, an error in the remote wrap is detected.

Thus, this "Remote Wrap" facility contributes to ensure a safe transmission on the control link. Moreover, before a control link is tested using the 'Remote Wrap' facility previously described, a 'Local Wrap' test is possible in DCA itself.

This is also shown in FIG. 7 where the inverted DCA DATA line (34) is fed back into DCA Shift Register (42) serial input, instead of normal DEVICE DATA line (36) as in FIG. 4 (Request line is kept inactive during this test).

More particularly, the DCA DATA line (34) is fed back into DCA Shift Register (42) through inverter (144), AND gate (148) and OR gate (150) including two AND gates (146,148) having their outputs Ored by an OR gate (150) connected to the input of DCA Shift Register (42).

Besides, AND gate (148) receives, from the Control Unit, the "LOCAL WRAP" command through wire (140).

Thus, upon receipt of a "LOCAL WRAP" test demand by the DCA (14) (LOCAL WRAP signal high), the bits output by the DCA Shift Register (42) are wrapped back toward the input of same register through wire (149), Inverter (144), AND gate (148) and OR gate (150). Consequently, after N clock pulses, the DCA Shift Register (42) must contain the original content inverted and this is very simply tested. If it is not the case, an erroneous shifting of the Device Shift Register (42) of the DCA port (14) is detected and an error recovery phase (out of the scope of the invention) is entered by the Control Unit.

Thus, this facility ensures an efficient local wrap test.

It is to be noted that if, instead of the described arrangement, the DCA DATA were fed back directly into the serial input of DCA Shift Register without being inverted, the content of DCA Shift Register after N clock pulses would be unchanged. In fact the same result would mistakenly appear if no data were shifted; thus such a test would not be efficient.

Figure 8:
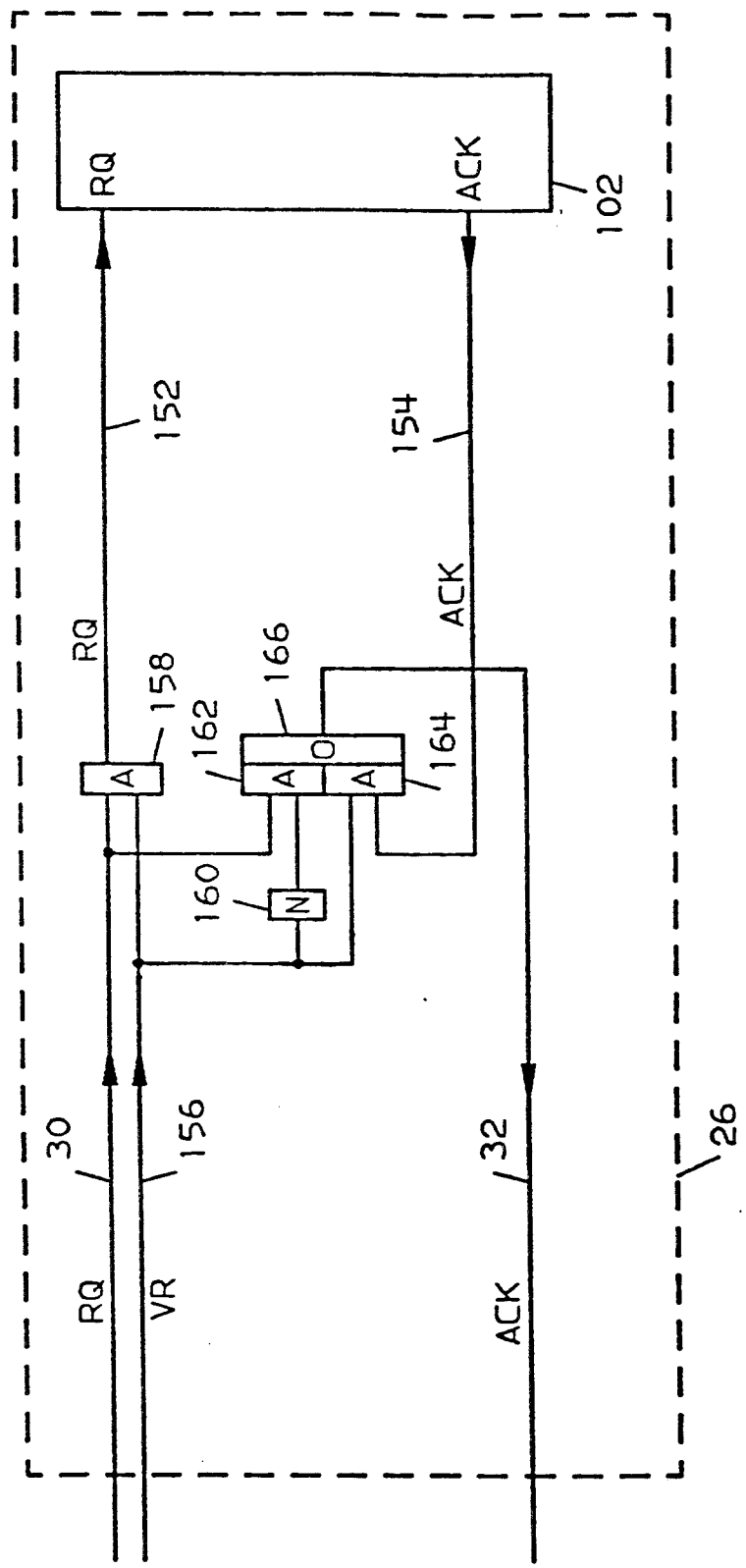
FIG. 8 represents still another testing facility of the Control Link.

FIG. 8 shows a further reliability enhancement feature, consisting in a Request/Acknowledge remote wrap facility, which makes sure that Request and Acknowledge lines (30,32) are operational before being used.

Therefore, an additional line is needed in the control link: a unique VALID REQUEST (VR) line (156) per link (16), which is ANDed by AND gate (158) with the normal Request line (30). Thus, when this VR line is inactive, the Device Protocol Control Logic (102) does not receive the Request signal, which is wrapped onto the Acknowledge line (32) of the device port (26) through a two-AND/OR circuit (162,164,166).

Furthermore, any Acknowledge signal which would be transmitted by the Device Protocol Control Logic (102) to the DCA port (26) has to cross the same two-AND/OR circuit gated by the VALID REQUEST signal. Thus, no Acknowledge signal corresponding to an erroneous Request signal could be transmitted by the device to the Control Unit.

Finally, the link testing facilities as described above allow a full test of the control link without any impact on a device.

The protocol of the control link of the invention will now be described, with reference to the timings shown in FIGS. 9,10 and table of FIG. 12. It is to be noted that in all said timings, XXX in a given field indicates that this field is not significant. It has already been mentioned that each transfer (write or read operation) between DCA and device consists in two phases called phase 1 and phase 2, N bits of information being exchanged during each phase.

Figure 9:
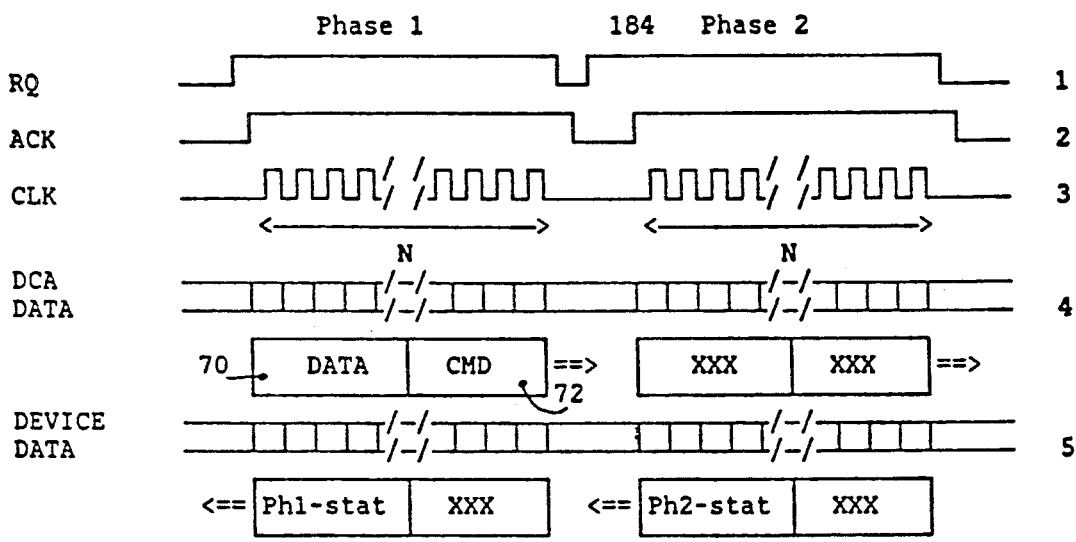
FIG. 9 represents timing diagrams in the case where data are being written by the Control Unit into a device.
Figure 11:
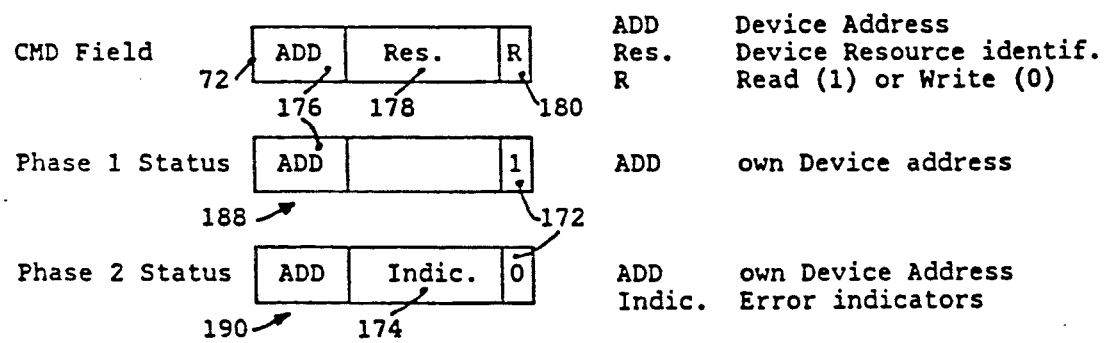
FIG. 11 partly represents the command/status fields within the N-bit shift registers of the device.

FIG. 9 shows the main timing diagrams related to a write operation, wherein the data field (70) of the N-bit word has to be written by the DCA port (14) of the Control Unit into an internal resource (56,58) of a device (18) (FIG. 4). Indeed, it is assumed that, prior to the write operation, the word to be transmitted to the device has been loaded by the control processor (12) into the DCA shift register (42) (State 1 of DCA, in FIG. 12). This loading triggers the DCA from an "idle" state (0) to a "busy" state (1), wherein no new operation toward a device is possible. This word, as shown in FIGS. 4 and 5, includes a data field (70) containing the data to be transmitted to an internal resource (56,58) of the device, and a command field (72) containing (as shown in FIG. 11) the address (176) of the device within the configuration, the device resource identification (178) and a Read/Write indicator (180)(read: R=1; write: R=0).

Similarly, prior to the write operation, the device shift register (44) is assumed to have been loaded with a phase 1 status word (188) located in the status field of said register (44) (State 1 of Device, in FIG. 12).

Of course, this phase 1 status word, as shown in FIG. 11, depends on the type of device used with the present link, but generally speaking, it contains at least the own cabled address field (176) of the device (among the other devices of the configuration) and a phase indicator (172) (phase 1=1).

The phase 2 status word (190) also contains the own cabled address field (176) of the device, a phase indicator (172) (phase 2=0), and an error indicators field (174), said indicators reflecting the status of the internal test registers (parity checking etc. . .) which may be contained in each device.

Figure 10:
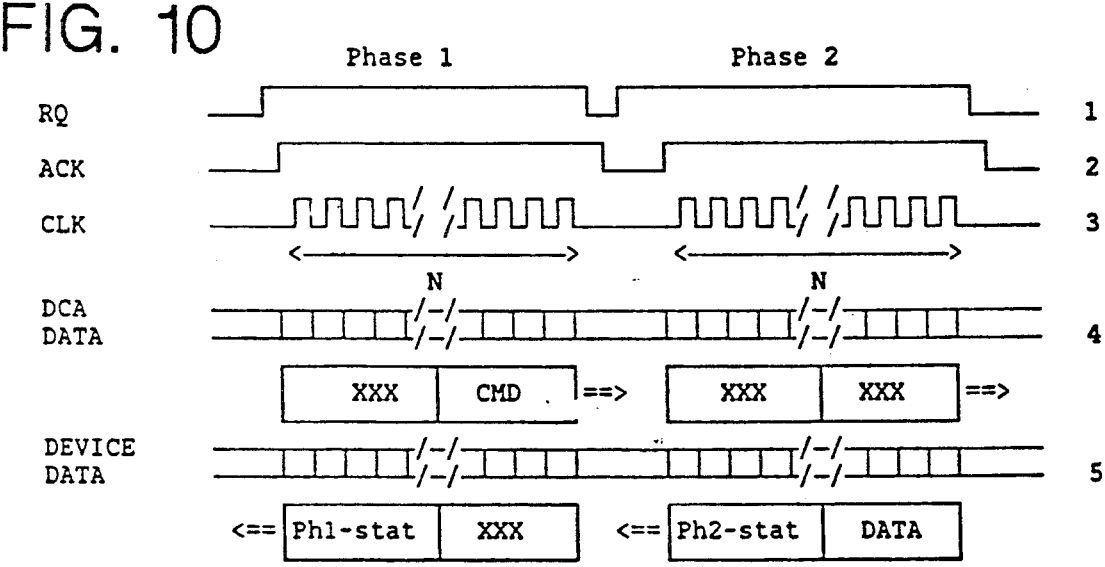
FIG. 10 represents timing diagrams in the case where data are being read from a device by the Control Unit.

As shown in FIGS. 9 and 10, and summarized in FIG. 12, each of both hand-shaking phases (1,2) are initiated by the event of the Request Signal sent by DCA (14) becoming active (DCA operation States 2 and 5, FIG. 12). When the Request Signal is set high by DCA at the beginning of phase 1 and transmitted to a device, said device sends back an Acknowledgment. Mean while, a DCA internal timer (within DCA Protocol control logic 212) is started and the Acknowledgment must be returned by the device within a predetermined time interval.

When the Acknowledgment has been received by the DCA, the Control Unit provides N clock pulses (timing 3 of FIG. 9), during which the N-bit word (DATA+command fields) contained in the DCA shift register (42) is transmitted to the device, while the N bits word (Phase 1 status) contained in the Device Shift Register (44) is transmitted from the device to the DCA.

Thus, after N clock pulses, the control unit will be able to verify if the word was transmitted to the right device This verification is made by simple comparison, within the Device Control Logic (60) (FIG. 4), on the one hand, of the corresponding address fields (176) (FIG. 11), and on the other hand, the phase 1 status indicator (172) is checked to be on.

Then, the Request signal is dropped, and so is the Acknowledgement sent by the device as soon as it receives the Request Signal off.

At this stage, phase one is ended, and the control unit is in communication with the right device, although the write or read operation with an internal resource (118) of the device remains to be done. This will be performed during phase 2.

The two phases are separated by a predetermined time interval (184) monitored by the device, after which the control unit is supposed to raise again the Request signal.(State 5 of DCA, FIG. 12). If it is not the case, a time out is reached, the transmission is interrupted and the device state is forced to zero (idle state).

Phase 2 starts when the second Request is received by the device.

During this second phase, the command contained in the command field (72) is checked and executed by the device. Then, an N bit word containing a "phase 2" status word is loaded into the Device Shift Register (44) and a second acknowledgment is sent to the DCA when this loading is done.

Upon receipt of this acknowledgment by the DCA, the latter sends N clock pulses to the device, during which the phase 2 status word (and data in case of a read operation) is transmitted to the DCA.

At the end of this shift operation, the Request signal is set off by the DCA, the content of phase 2 status word is checked, and the Device sends Acknowledge off upon receipt of Request Signal off.

Then, the transmission is ended and both the DCA and the device are idle again.

It is to be noted that, for a write operation from DCA (14) into a device (18), the N-bit word transmitted by the DCA to the device during phase 1 includes a data field (70) to be written into a given device resource (56, 58) specified in the command field (72).

Similarly, for a read operation, although the same hand-shaking . mechanism is used, the DCA transmits only a command field (72) to the device during phase 1, and during phase 2, a data field (70) to be read from a given resource (56, 58) specified in the command filed, is transmitted to the DCA together with a phase status word.

We claim:

1. A control link (16) for exchanging data between a control unit (10,14) and a plurality of devices connected to said control unit, including with reference to the control unit: an outgoing clock line (38) provided to each device, an outgoing DATA line (34), shift register means including device shift registers (44) and control unit shift register (42) respectively located within said devices and said control unit, and an ingoing DEVICE DATA line, said control link being characterized in that it includes:

an outgoing request line (30) dedicated to each device for individually selecting a given device to be written into or read from by the control unit;

an ingoing acknowledge line (32) for acknowledging the receipt by a given device of a request signal transmitted by the control unit;

in each device, a data ingoing port (DI) for receiving data from the control unit and a data outgoing port (DO) for sending data to the control unit;

in each device, means (80,76) for wrapping the data ingoing port to the data outgoing port when the device is not selected by a request signal from the control unit; and means (78,76) for connecting the device shift register (44) of a device selected by the receipt of a request signal from the control unit into a loop (74) formed by the control unit shift register (42), the outgoing data line (34) and the ingoing device data line (36), with exchange of data between the control unit and a selected one of the plurality of devices for each write or read operation being controlled by the control unit issuing a first request signal on the request line to the selected one of the plurality of devices, with said selected one of the plurality of devices responding to said control unit with a first acknowledge signal on the ingoing acknowledge line (32) whereupon the control unit issues clock pulses on the outgoing clock line to shift data from the control unit shift register into the loop and the selected device issues a first status signal to said control unit whereupon said control unit issues a second request signal on the request line to the selected one of the plurality of devices, with said device responding with a second acknowledge signal on the ingoing acknowledge line (32) and a second status signal which is gated into the loop by clock pulses generated by the control unit.

2. A control link according to claim 1 further including means for permanent checking said loop when no transmission is currently made with a device, said means including a Device Control Adapter (DCA) remote wrap facility comprising a loop realized by DCA shift register (42), DCA Data Line and Device Data Line (36,34) and circuit arrangement coupled to the DCA shift register, said circuit arrangement intercepting data on said device data line and inverting the polarity of said data before the data is delivered to the DCA shift register.

3. The control link according to claim 2 further including a local wrap facility comprising a local loop realized by a conductor (149) interconnecting a serial output of said DCA shift register to said circuit arrangement.

4. The control link according to claim 3 wherein the circuit arrangement includes a logical OR circuit having an output coupled to the DCA shift register, a first and second logical AND circuit means coupled to the OR circuit means and two inverter circuits one of each connected to an input of the first and second logical AND circuit means.

* * * * *